US012194470B2

(12) United States Patent
Nater et al.

(10) Patent No.: US 12,194,470 B2
(45) Date of Patent: Jan. 14, 2025

(54) AGITATOR BALL MILL

(71) Applicant: Bühler AG, Uzwil (CH)

(72) Inventors: Eduard Nater, Zuckenriet (CH); Achim Sturm, Niederuzwil (CH); Andreas Rieche, Kreuzlingen (CH); Thomas Versnik, Oberbüren (CH)

(73) Assignee: BUHLER AG, Uzwil (CH)

( * ) Notice: Subject to any disclaimer, the term of this patent is extended or adjusted under 35 U.S.C. 154(b) by 230 days.

(21) Appl. No.: 17/907,056

(22) PCT Filed: Mar. 26, 2021

(86) PCT No.: PCT/EP2021/057973
§ 371 (c)(1),
(2) Date: Sep. 22, 2022

(87) PCT Pub. No.: WO2021/191430
PCT Pub. Date: Sep. 30, 2021

(65) Prior Publication Data

US 2023/0158511 A1 May 25, 2023

(30) Foreign Application Priority Data

Mar. 27, 2020 (EP) .................................... 20166428

(51) Int. Cl.
*B02C 17/16* (2006.01)
*B02C 17/18* (2006.01)

(52) U.S. Cl.
CPC .......... *B02C 17/163* (2013.01); *B02C 17/161* (2013.01); *B02C 2017/165* (2013.01); *B02C 17/184* (2013.01)

(58) Field of Classification Search
CPC ..... B02C 17/16; B02C 17/161; B02C 17/163; B02C 17/166; B02C 17/184; B02C 2017/165
See application file for complete search history.

(56) References Cited

U.S. PATENT DOCUMENTS 5,133,508 A 7/1992 Stehr et al.
5,894,998 A 4/1999 Schall et al.

FOREIGN PATENT DOCUMENTS

CN 1215632 A 5/1999
CN 1307934 A 8/2001

(Continued)

OTHER PUBLICATIONS

Translation of DE-19638354 (Year: 1998).*

*Primary Examiner* — Bobby Yeonjin Kim
(74) *Attorney, Agent, or Firm* — Colson Law Group, PLLC

(57) ABSTRACT

An agitator mill having a circular-cylindrical outer stator and an agitator having a circular-cylindrical rotor. The rotor is arranged within the outer stator, and a milling chamber between the rotor and the outer stator. In the milling chamber, a through-flow direction which extends from a feed channel to a discharge channel. Several rotor milling tools are attached to the rotor, wherein several outer-stator milling tools are attached to the outer stator. The outer-stator milling tools are arranged adjacent to and in the circumferential direction and form rows. These rows are arranged parallel to one another on the outer stator. On the side, facing away from the feed channel the outer-stator milling tools of at least one row have a greater radial length than the other outer-stator milling tools. The outer-stator milling tools of each row in the circumferential direction each have the same length.

15 Claims, 1 Drawing Sheet

(56) References Cited

FOREIGN PATENT DOCUMENTS

| | | | | | |
|---|---|---|---|---|---|
| CN | 101287554 | A | | 10/2008 | |
| DE | 2329987 | A1 | | 1/1975 | |
| DE | 2629251 | A1 | | 1/1978 | |
| DE | 4008472 | A1 | | 10/1990 | |
| DE | 19638354 | A1 | * | 3/1998 | ........... B02C 17/161 |
| EP | 1992412 | B1 | | 2/2010 | |
| GB | 1416293 | A | * | 12/1975 | ............. B02C 17/16 |
| JP | 1998099703 | A | | 4/1998 | |
| JP | 2006255519 | A | | 9/2006 | |
| JP | 2010188348 | A | | 9/2010 | |
| KR | 10-2057452 | B1 | | 12/2019 | |
| WO | 2006/116338 | A2 | | 11/2006 | |

* cited by examiner

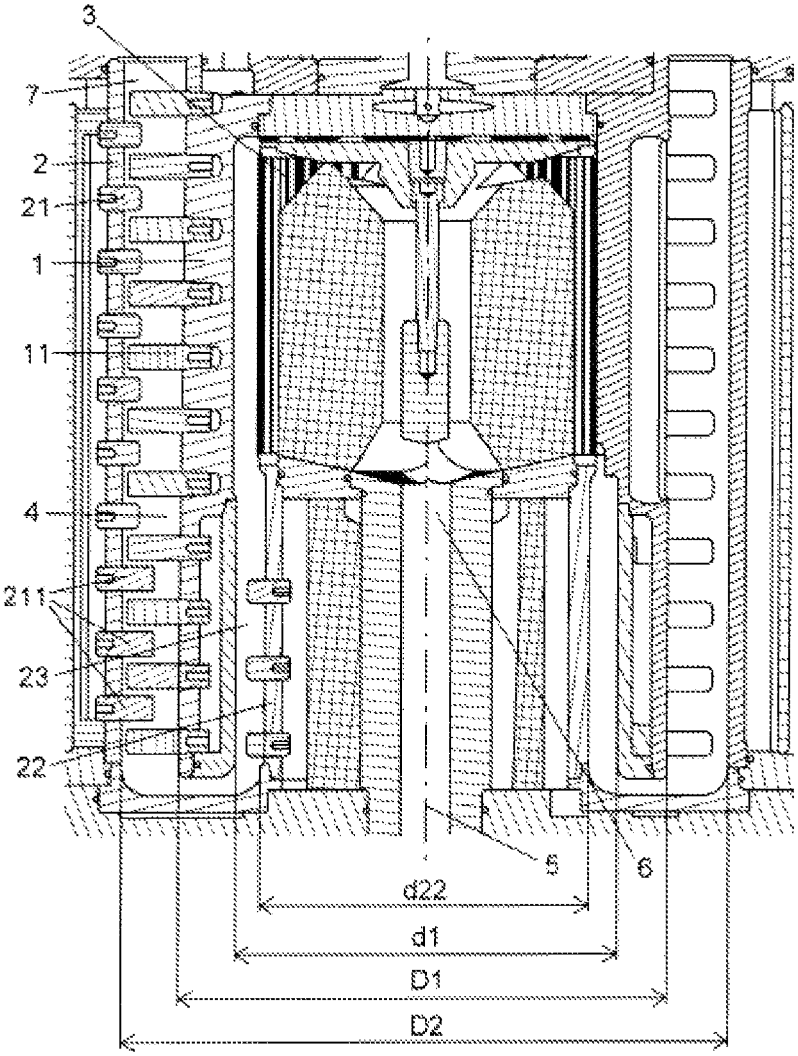
3
7
2
21
1
11
4
211
23
22
5
6
d22
d1
D1
D2

AGITATOR BALL MILL

The present disclosure relates to an agitator ball mill, and in particular an agitator ball mill in which an improved fluidization and distribution of the milling elements within the agitator ball mill is ensured.

The basic structure of an agitator ball mill (Rührwerkskugelmühle, or RWKM) is known, for example, from EP 1 992 412 B1. In the case of conventional agitator ball mills, the milling elements can congregate and compress by gravity in the lower region of the milling chamber during rinsing and during production of easy-flowing products. This can lead to a reduction in product quality or an extension of the processing time due to an unfavorable distribution of the milling elements within the agitator ball mill.

Agitator ball mills are also known, for example, from documents DE 4 008 472 A1, DE 19 638 354 A1, and WO 2006/116338 A2.

It is thus the object of the present disclosure to achieve a lower power consumption in the case of easy-flowing products with low viscosities and/or lower tack—in particular, by a better distribution of the milling elements within the agitator ball mill. The invention is defined by the features of independent claim 1. The dependent claims describe preferred embodiments.

The present disclosure comprises an agitator mill for treating flowable material to be milled, having a circular-cylindrical outer stator and an agitator mounted rotatably about a common central axis and having a circular-cylindrical rotor. The rotor is arranged inside the outer stator, and a milling chamber is formed between the rotor and the outer stator. The milling chamber has a constant width between the outer stator and the rotor. A feed channel through which the material to be milled can be guided into the milling chamber is upstream of the milling chamber. Furthermore, a discharge channel is provided through which the material to be milled can leave the milling chamber. The feed and discharge channels thus define a through-flow direction through the milling chamber, which extends from the feed channel to the discharge channel.

The milling chamber is at least partially filled with milling elements. Furthermore, rotor milling tools which extend radially in the direction of the outer stator are attached to the rotor. Moreover, outer-stator milling tools, which project radially by a length into the milling chamber, are attached to the outer stator. The outer-stator milling tools are arranged adjacent to and at a distance from one another in the circumferential direction and form rows. These rows are arranged parallel to one another on the outer stator along the central axis. The outer-stator milling tools are also arranged in longitudinal rows, i.e., perpendicular to the circumferential direction and along the central axis.

The outer-stator milling tools thus form longitudinal rows in the direction of the central axis, i.e., along the through-flow direction, and also rows perpendicular thereto, i.e., in a circular configuration around the circumference of the outer stator.

The outer milling tools of at least one row, and preferably of three rows, of outer-stator milling tools on the side, facing away from the feed channel, of the milling chamber have a greater radial length than the remaining outer-stator milling tools. In other words, the outer-stator milling tools, at least of the rearmost—in the through-flow direction—row(s) in the circumferential direction, i.e., all those outer-stator milling tools which lie on circles around the circumference of the outer stator, which are most distant from the feed channel, therefore have a greater radial length than the other outer-stator milling tools.

The outer stator preferably has six to twelve rows of outer-stator milling tools in the circumferential direction and/or eight to twenty longitudinal rows of outer-stator milling tools.

In one embodiment, in which the agitator mill in operation is arranged such that the central axis is vertically oriented, and the through-flow direction in the milling chamber runs from top to bottom, the lower row or the lower—preferably three—rows in the circumferential direction is or are of greater length than the rows with outer-stator milling tools.

The outer-stator milling tools of each row in the circumferential direction can each be of the same length. The length of the outer-stator milling tools with greater length can be longer than the length of the other outer-stator milling tools by a factor of 1.5 to 2.5, preferably 1.75 to 2.25, and particularly preferably 2.0. The length of the other outer-stator milling tools can be between 5 and 20 mm, and preferably between 7 and 15 mm.

The rotor milling tools are preferably each of the same length—for example, 20 mm to 40 mm.

The outer-stator milling tools and/or the rotor milling tools are preferably designed in the form of pins. The pins preferably have a cylindrical shape, wherein the length is at least as large as the diameter of the pins.

A separating device can be provided within the rotor. In the through-flow direction, the discharge channel for discharging the flowable material to be milled can be arranged downstream of the separating device.

The invention is further described with reference to FIG. 1. It shows a cross-section through an agitator ball mill according to an example of the invention.

In the following, reference is made to a vertical agitator ball mill (RWKM) according to FIG. 1, i.e., to an agitator ball mill according to a preferred embodiment, which in operation is arranged such that a central axis 5 is vertically oriented, and the through-flow direction runs from top to bottom. The direction parallel to the central axis 5 is referred to as the axial direction. However, the invention can also be used in a horizontally or obliquely arranged agitator ball mill.

The agitator ball mill shown in FIG. 1 has an agitator with an essentially cylindrical rotor 1, wherein the rotor 1 has an outer diameter D1 and an inner diameter d1. The rotor 1 is rotatably mounted about the central axis 5. According to the embodiment shown, this is oriented vertically. Furthermore, the agitator ball mill has an outer stator 2 with outer stator diameter D2, which surrounds the rotor 1. In particular, the inner wall of the outer stator 2 facing the rotor 1 is circular-cylindrical. The rotor 1 and outer stator 2 are coaxial with the central axis 5. Furthermore, the rotor 1 has a circular-cylindrical outer wall. Between the outer stator 2 and the rotor 1, a milling chamber 4 is thus formed, which has the same radial thickness over its entire height and in the circumferential direction. The milling chamber 4 thus has a constant annular dimension. The material to be milled that is to be treated is introduced into the milling chamber 4 via a feed channel 7.

Also coaxial with the central axis 5, the agitator ball mill has an inner stator 22 with inner-stator outer diameter d22, which, with the radially inner side of the rotor 1, forms a discharge space 23. The discharge space 23 is connected to the milling chamber 4 via a channel, which in FIG. 1 is formed below the rotor 1. The dispersed product thus flows out of the milling chamber 4 via the channel into the discharge space 23 to a separating device 3, which is arranged above the inner stator 22. The separating device 3 is designed to hold back any milling elements that may be entrained. A discharge channel 6, which discharges the finished product from the machine, is located centrally within the separating device 3.

Rotor milling tools 11, which project into the milling chamber 4 in the radial direction, are attached to the outer wall of the rotor 1. Outer-stator milling tools 21, 211, which project into the milling chamber 4 in the radial direction, are attached to the inner wall of the outer stator 2. The tools 11, 21, 211 are attached offset in such a way that, when the rotor 1 rotates, an adequate distance is created between them.

The tools 11, 21, 211 are preferably mounted, on the circular-cylindrical outer wall of the rotor 1 or on the circular-cylindrical inner wall of the outer stator 2, in longitudinal rows parallel to the central axis, i.e., vertically, as well as in the circumferential direction. In each case, the tools 11, 21, 211 are preferably spaced equally apart from one another in the longitudinal direction and/or in the circumferential direction. In other words, the tools 11, 21, 211 are distributed uniformly. Each longitudinal row of the tools 11, 21, 211 preferably has six to twenty tools 11, 21, 211 per row. Furthermore, per row of tools 11, 21, 211, six to twelve tools 11, 21, 211 are preferably attached in the circumferential direction. However, the invention is not bound to the number of tools 11, 21, 211 in the longitudinal and/or circumferential directions and can be applied to any agitator ball mill with stator and rotor tools.

In the following, unless otherwise defined, the length designates the radial length of the tools 11, 21, 211, i.e., the length by which the tools 11, 21, 211 project radially into the milling chamber 4, i.e., in the direction of the outer stator 2 or in the direction of the rotor 1. The rotor tools 11 are of the same length. The rotor tools 11 generally have a length of approximately 20 mm to 40 mm. According to the invention, the outer-stator milling tools 211 have a greater length in the rear—in the through-flow direction—region of the outer stator 2—i.e., in the embodiment shown, in the lower region of the outer stator (cf. FIG. 1). The rear region faces the channel which connects the milling chamber 4 and the discharge space 23. Here, the rows of outer-stator milling tools 21, 211 in the circumferential direction each have the same length. At least the lowest (rearmost in the through-flow direction) row in FIG. 1 of the outer-stator milling tools 211—preferably the lowest two rows, and particularly preferably the lowest three rows—have a greater length than the remaining outer-stator milling tools 21. If, in the vertical direction, more than one row of the outer-stator milling tools 211 has a greater length, these outer-stator milling tools 211 will preferably have the same length. A gradual increase in the length of the outer-stator milling tools 21, 211 in the through-flow direction can also be useful.

The length of the outer-stator milling tools 211 with greater length can be greater than the length of the other outer-stator milling tools 21 by a factor of 1.5 to 2.5, preferably 1.75 to 2.25, and particularly preferably a factor of 2.0. The length of the other outer-stator milling tools 21 can be between 5 and 20 mm, and preferably between 7 and 15 mm.

According to the present exemplary embodiment, the ratio of the rotor outer diameter D1 to the outer-stator inner diameter D2, wherein the diameters are in each case measured without taking the milling tools 11, 21, 211 into account, is defined as follows:

$$0.6 \leq \frac{D1}{D2} \leq 0.95.$$

Furthermore, according to the example, the ratio of the inner-stator outer diameter d22 to the rotor inner diameter d1, wherein d22 is measured without taking the pins shown in FIG. 1 into account, is defined as follows:

$$0.8 \leq \frac{d22}{d1} \leq 0.95.$$

Furthermore, according to one example, the ratio of the number of outer-stator milling tools 211 with greater length to the number of other outer-stator milling tools 21 is between 0.1 and 0.5. For example, the outer stator 2 has two outer-stator milling tools 211 with greater length and eight other outer-stator milling tools 21.

By way of example, the ratio of the height by which outer-stator milling tools 211 with greater length project into the milling chamber 4 to the total height of the milling chamber 4 (length of the outer stator 2) is between 0.05 and 0.3, and preferably between 0.1 and 0.2.

The height by which the outer-stator milling tools 211 with greater length project into the milling chamber 4 is to be understood as the length by which the outer-stator milling tools 211 with greater length extend in the axial direction, i.e., the region of the milling chamber 4, in which the length, in which the outer-stator milling tools 211 with greater length are arranged in the milling chamber. In other words, in the case of a vertical agitator mill, this corresponds to the height of the processing zone (milling chamber 4), which is covered by the longer outer-stator milling tools 211.

In an exemplary extension of the outer-stator milling tools 211 with greater length in the milling chamber 4 of 150 mm and a milling chamber length or length of the outer stator 2 (processing zone height) of 500 mm, a ratio of 0.3 results.

The ratio of the length by which outer-stator milling tools 211 project into the milling chamber 4 to the outer-stator inner diameter D2 is preferably between 0.05 and 0.4, and particularly preferably between 0.2 and 0.3. For an extension of the outer-stator milling tools 211 with greater length in the milling chamber 4 of 150 mm and an outer-stator inner diameter D2 of 550 mm, a ratio of 0.27 results.

In agitator ball mills, a congregation of milling elements can occur during the milling or dispersal operation in the rear—in the through-flow direction—region due to drag forces, and—particularly in the case of vertical agitator ball mills—also due to gravity. Even in the case of horizontal or oblique agitator ball mills, milling elements can congregate in a part of the milling chamber—in particular, downwards in the through-flow direction—due to the drag forces. The extended outer-stator milling tools in the rear—in the through-flow direction—region result in improved fluidization of the milling elements throughout the agitator ball mill. A congregation of milling elements in one part of the machine can effectively be prevented. However, if a congregation of milling elements should occur during operation, this can be noticeably loosened up and set in motion by the use of longer pins in the lower region of the outer stator. Improved comminution results or better milling results are thereby achieved, and the product quality is increased. In particular, the arrangement enables a lower power consumption in the case of easy-flowing products with low viscosities (toughness) and/or lower tack.

Furthermore, vibrations occurring in the machine due to congregations of milling elements can be reduced.

The milling tools of the present disclosure are preferably glued in. This prevents process-related manipulation of the mill during operation. The tools are sealed to the stator by adhesive bonding, which prevents a reduction in the cooling surface. The tools of the outer stator are preferably provided in two, different defined lengths. There is thus only one step in tool length in the axial direction. This further ensures constant milling conditions over the entire duration of the milling.

The invention can also be applied in an existing agitator ball mill—in particular, in an agitator ball mill whose outer-stator milling tools are designed to be interchangeable. In order to correspondingly retrofit such an agitator ball mill, the outer-stator milling tools of the rows in the circumferential direction that face away from the feed channel are replaced by outer-stator milling tools, which have a correspondingly greater length. In this case, according to the present invention, the outer-stator milling tools of a desired number of rows are replaced, i.e., at least the tools of the row rearmost in the through-flow direction, and preferably those of the three rearmost rows.

Although the invention is illustrated and described in detail by means of figures and the associated description, this representation and this detailed description are to be understood as illustrative and exemplary, and not as limiting the invention. It is understood that those skilled in the art may make changes and modifications without departing from the scope of the following claims. In particular, the invention also comprises embodiments having any combination of features that are mentioned or shown above with respect to various aspects and/or embodiments.

The invention also includes individual features in figures, even if they are shown there in connection with other features and/or are not mentioned above.

Furthermore, the term, "comprise," and derivatives thereof do not exclude other elements or steps. Likewise, the indefinite articles, "a" or "an," and derivatives thereof do not exclude a plurality. The functions of several features listed in the claims may be fulfilled by one unit. The terms, "substantially," "around," "approximately," and the like, in conjunction with a property or a value, also define in particular precisely the property or precisely the value. None of the reference signs in the claims are to be understood as limiting the scope of the claims.

LIST OF REFERENCE SIGNS

1 Rotor
11 Rotor milling tools
2 Outer stator
21 Outer-stator milling tools
211 Outer-stator milling tools with greater length
22 Inner stator
23 Discharge space
3 Separating device
4 Milling chamber
5 Central axis
6 Drainage channel
7 Feed channel
d1 Rotor inner diameter
D1 Rotor outer diameter
D2 Outer-stator inner diameter
d22 Inner-stator outer diameter

The invention claimed is:

1. An agitator mill for processing flowable material to be milled, comprising:
- a circular-cylindrical outer stator,
- an agitator which is rotatably mounted about a common central axis and has a circular-cylindrical rotor, wherein the rotor is arranged within the outer stator, and
- wherein a milling chamber is formed between the rotor and the outer stator, wherein, in the milling chamber, a through-flow direction is defined which extends from a feed channel to a discharge channel,
- wherein the milling chamber between the outer stator and the rotor has a constant width,
- wherein the milling chamber is at least partially filled with milling elements, wherein several rotor milling tools which extend in the direction of the outer stator are attached to the rotor,
- wherein several outer-stator milling tools, which project radially by a length into the milling chamber, are attached to the outer stator, and
- wherein the outer-stator milling tools are arranged adjacent to and at a distance from each other in the circumferential direction and form rows, and
- these rows are arranged parallel to one another on the outer stator along the central axis,
- wherein the outer-stator milling tools comprise a first set of outer-stator milling tools forming a first set of outer-stator milling tool rows and a second set of outer stator milling tools forming a second set of outer-stator milling tool rows, the first set having a greater radial length than the second set, each of the outer-stator milling tools of the first set having the same radial length and each of the outer-stator milling tools of the second set having the same radial length, and
- wherein the outer-stator milling tools of each row have the same length in the circumferential direction.

2. The agitator mill according to claim 1, wherein the outer stator has six to twelve rows of outer-stator milling tools in the circumferential direction and/or eight to twenty longitudinal rows of outer-stator milling tools in the direction of the central axis.

3. The agitator mill according to claim 1, wherein a ratio of a number of the first set of outer-stator milling tools to a number of the second set of outer-stator milling tools is between 0.1 and 0.5.

4. The agitator mill according to claim 1, wherein the agitator mill in operation is arranged such that the central axis is oriented vertically, and the through-flow direction in the milling chamber runs from top to bottom such that the lower row or the lower rows in the circumferential direction are the rows with the first set of outer-stator milling tools.

5. The agitator mill according to claim 1, wherein the length of the first set of outer-stator milling tools is longer than the length of the second set of outer-stator milling tools by a factor of 1.5 to 2.5.

6. The agitator mill according to claim 1, wherein the length of the second set of outer-stator milling tools is between 5 and 20 mm.

7. The agitator mill according to claim 1, wherein the rotor milling tools each have the same length.

8. The agitator mill according to claim 1, wherein the outer-stator milling tools and/or the rotor milling tools are designed in the form of pins.

9. The agitator mill according to claim 8, wherein the pins have a cylindrical shape, wherein the length is at least as large as the diameter of the pins.

10. The agitator mill according to claim 1, wherein a separating device is provided within the rotor.

11. The agitator mill according to claim 1, wherein, for a ratio of a rotor outer diameter D1 to an outer-stator internal diameter D2, the following applies:

$$0.6 \leq \frac{D1}{D2} \leq 0.95.$$

12. The agitator mill according to claim 1, wherein, for a ratio of an inner-stator outer diameter d22 to a rotor inner diameter d1, the following applies:

$$0.8 \leq \frac{d22}{d1} \leq 0.95.$$

13. The agitator mill according to claim 1, wherein the length of the first set of outer-stator milling tools is longer than the length of the second set of outer-stator milling tools by a factor of 1.75 to 2.25.

14. The agitator mill according to claim 1, wherein the length of the first set of outer-stator milling tools is longer than the length of the second set of outer-stator milling tools by a factor of 2.0.

15. The agitator mill according to claim 1, wherein the length of each of the second set of outer-stator milling tools is between 7 and 15 mm.

* * * * *